United States Patent [19]

Matsubishi et al.

[11] Patent Number: 5,235,536
[45] Date of Patent: Aug. 10, 1993

[54] ABSOLUTE DIFFERENCE PROCESSOR ELEMENT PROCESSING UNIT, AND PROCESSOR

[75] Inventors: Noritsugu Matsubishi; Yoshio Tokuno; Hiroshi Masaki; Masato Yamazaki, all of Tokyo, Japan

[73] Assignee: Oki Electric Industry Co., Ltd., Tokyo, Japan

[21] Appl. No.: 762,348

[22] Filed: Sep. 19, 1991

[30] Foreign Application Priority Data

Sep. 20, 1990 [JP] Japan .................................. 2-250733

[51] Int. Cl.[5] ............................................ G06F 7/52
[52] U.S. Cl. .................................... 364/736; 364/760
[58] Field of Search ............. 364/736, 754, 760, 715.01

[56] References Cited

U.S. PATENT DOCUMENTS

| | | | |
|---|---|---|---|
| 4,825,359 | 4/1989 | Ohkami et al. | 364/736 |
| 4,910,701 | 3/1990 | Gibbons et al. | 364/760 |
| 4,982,352 | 1/1991 | Taylor et al. | 364/715.01 |

FOREIGN PATENT DOCUMENTS

| | | |
|---|---|---|
| 1524163 | 7/1966 | Fed. Rep. of Germany . |
| 58-132861 | 8/1983 | Japan . |
| 2247330 | 2/1992 | United Kingdom . |

OTHER PUBLICATIONS

Casey et al., "Digital Signal Processing IC Helps to Shed New Light on Image Processing Applications," 2328 Electronic Design 34, No. 7, Mar. 20, 1986, pp. 135-140.

Sakiyama et al., "A 200 MIPS Image Signal Multi-Processor on a Single Chip", Preprints of the 1990 Spring General Meeting of the Institute of Electronics, Information, and Communication Engineers, SA-4-2, pp. 1-415 to 1-416.

Ohta et al., "Vector Processor Design for Parallel Digital Signal Processing Systems," Preprints of the 1990 Spring General Meeting of the Institute of Electronics, Information, and Communication Engineers, SA-4-4, pp. 1-419 to 1-420.

Yamaguchi et al., "High-Speed Digital Video Signal Processor KZ5000," IEICE Transactions on Integrated Circuits, ICD90-15 (1990), pp. 59 to 66.

"Communications Workstation for TV-Telephone Compresses Images by Software", Nikkei Electronics [482], Sep. 18, 1989, pp. 100 to 101.

"320 MIPS DSP Developed for Motion Compensation in TV-Telephone", Nikkei Electronics [481], Sep. 4, 1989, p. 75.

Kanou et al., "16b 25ns Video/Image Signal Processor", IEICE Transactions on Integrated Circuits, ICD-89-6 (1989), pp. 37 to 44.

*Primary Examiner*—Long T. Nguyen
*Attorney, Agent, or Firm*—Spencer, Frank & Schneider

[57] ABSTRACT

A processing unit for executing parallel cumulative absolute difference operations in a first mode, and an inner product operation in a second mode, includes an input bus group for receiving first input data, second input data, and third input data. A plurality of processor elements are coupled to the input bus group, each processor element being coupled to compute a cumulative absolute difference between the first input data and the second input data in the first mode, and to compute and accumulate one term of Booth's algorithm for multiplying the first input data by the third input data in the second mode. An output bus group is coupled to the processor elements, for receiving the terms of Booth's algorithm. An accumulator circuit is coupled to the output bus group, for shifting and adding terms of Booth's algorithm output by the processor elements.

12 Claims, 12 Drawing Sheets

FIG.10

$$\begin{array}{c} \text{STEP 1} \\ \text{STEP 2} \\ \text{STEP 3} \\ \text{STEP 4} \end{array} \longrightarrow \begin{pmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{pmatrix} \cdot \begin{pmatrix} Y_{00} & Y_{01} & Y_{02} & Y_{03} \\ Y_{10} & Y_{11} & Y_{12} & Y_{13} \\ Y_{20} & Y_{21} & Y_{22} & Y_{23} \\ Y_{30} & Y_{31} & Y_{32} & Y_{33} \end{pmatrix}$$

$$\begin{array}{c} \phantom{PU} \\ \phantom{500-0} \end{array} \begin{array}{cccc} | & | & | & | \\ PU & PU & PU & PU \\ 500\text{-}0 & 500\text{-}1 & 500\text{-}2 & 500\text{-}3 \end{array}$$

$$= \begin{pmatrix} Z_{00} & Z_{01} & Z_{02} & Z_{03} \\ Z_{10} & Z_{11} & Z_{12} & Z_{13} \\ Z_{20} & Z_{21} & Z_{22} & Z_{23} \\ Z_{30} & Z_{31} & Z_{32} & Z_{33} \end{pmatrix} \begin{array}{l} \longrightarrow \text{STEP 1} \\ \longrightarrow \text{STEP 2} \\ \longrightarrow \text{STEP 3} \\ \longrightarrow \text{STEP 4} \end{array}$$

$$\begin{array}{cccc} | & | & | & | \\ PU & PU & PU & PU \\ 500\text{-}0 & 500\text{-}1 & 500\text{-}2 & 500\text{-}3 \end{array}$$

ABSOLUTE DIFFERENCE PROCESSOR ELEMENT PROCESSING UNIT, AND PROCESSOR

BACKGROUND OF THE INVENTION

The present invention relates to digital signal processing, more particularly to a processor element, processing unit, and processor adapted for efficient execution of both multiplication and other operations such as finding a cumulative absolute difference.

Digital signal processing being multiplication-intensive, the prior art abounds in processor elements that combine a hardware multiplier with other arithmetic and logic facilities such as an adder. Such processor elements (PEs) have often been assembled into array processors in which the individual PEs can operate in parallel for high-speed vector and matrix arithmetic, or can be pipelined to carry out more complex operations that a single PE cannot perform alone.

An example is a prior-art array processor developed for use in telephone apparatus that transmits compressed video images. The processor is configured as a four-by-four array of PEs, each comprising a multiplier and an adder. Operating concurrently and independently, the sixteen PEs perform 4×4 matrix operations. In addition, the four PEs in a row of the array can be interconnected to operate as a pipeline.

One operation for which the PEs must be pipelined is that of finding the cumulative absolute difference between two series of inputs, an operation necessary in image compression by the motion compensation method. In each pipeline the first PE finds the difference between two inputs, the second PE takes the absolute value of the difference, and the third PE adds the absolute value to the cumulative total. The fourth PE has no function.

One problem with this prior-art array processor is that only four pipelines can operate in parallel. In the standard motion-compensation method, detection of a single motion vector requires the determination of a large number of cumulative absolute differences, so it would be useful if cumulative absolute difference operations could be performed more than four at a time.

Another problem is that since each PE has its own hardware multiplier, the PEs are large in size. This limits the number of PEs that can be included in an array, especially when the array is implemented on a single semiconductor chip (as in the example above).

A further problem is that an array processor of the above type performs efficiently only in computations such as matrix multiplication that benefit from parallel multiply-add operations. In the cumulative absolute difference operation no use is made of the multiplier in each PE, even though the multiplier accounts for a large part of the PE'S circuitry.

Still another problem is that pipelining itself tends to be inefficient. In the example above, one PE in each pipeline was left idle.

SUMMARY OF THE INVENTION

An object of the present invention is accordingly to enable a single processor element to compute an absolute difference.

Another object of the invention is to enable a single processor element to compute a cumulative absolute difference.

Still another object is to perform multiplication by a processing unit comprising a plurality of processor elements which can also compute cumulative absolute differences individually, in parallel.

Yet another object is to compute an inner product by means of this processing unit.

A further object is to perform matrix multiplication efficiently.

A processor element comprises a shifter for shifting first input data by a controllable number of bits, first input means for selecting the shifted first input data or first result data, and second input means for selecting second input data or second result data. An arithmetic means controllably adds or subtracts the outputs of the first and second input means to produce the first and second result data. A first register stores the first result data for provision to the first input means. A second register stores the second result data for provision to the second input means, and for external output.

A processing unit comprises an input bus group, an output bus group, a plurality of the above processor elements connected in parallel between the input bus group and the output bus group, and a last-stage accumulator connected to the output bus group.

A processor comprises a plurality of the above processing units connected in parallel between an input bus group and an output bus group.

BRIEF DESCRIPTION OF THE DRAWINGS

FIG. 10 shows how the novel processor carries out matrix multiplication.

DETAILED DESCRIPTION OF THE INVENTION

A processor element, processing unit, and processor according to the invention will be described below with reference to the drawings. The novel devices perform cumulative absolute difference, inner product (cumulative multiply-add), and matrix multiplication operations which will also be described. The drawings are intended to illustrate the invention but not to limit its scope, which should be determined solely from the appended claims.

A description will first be given of a processor element (PE) that can calculate and accumulate absolute differences, perform operations useful in Booth's multiplication algorithm, and can execute various other arithmetic and logic operations.

Figure 1:
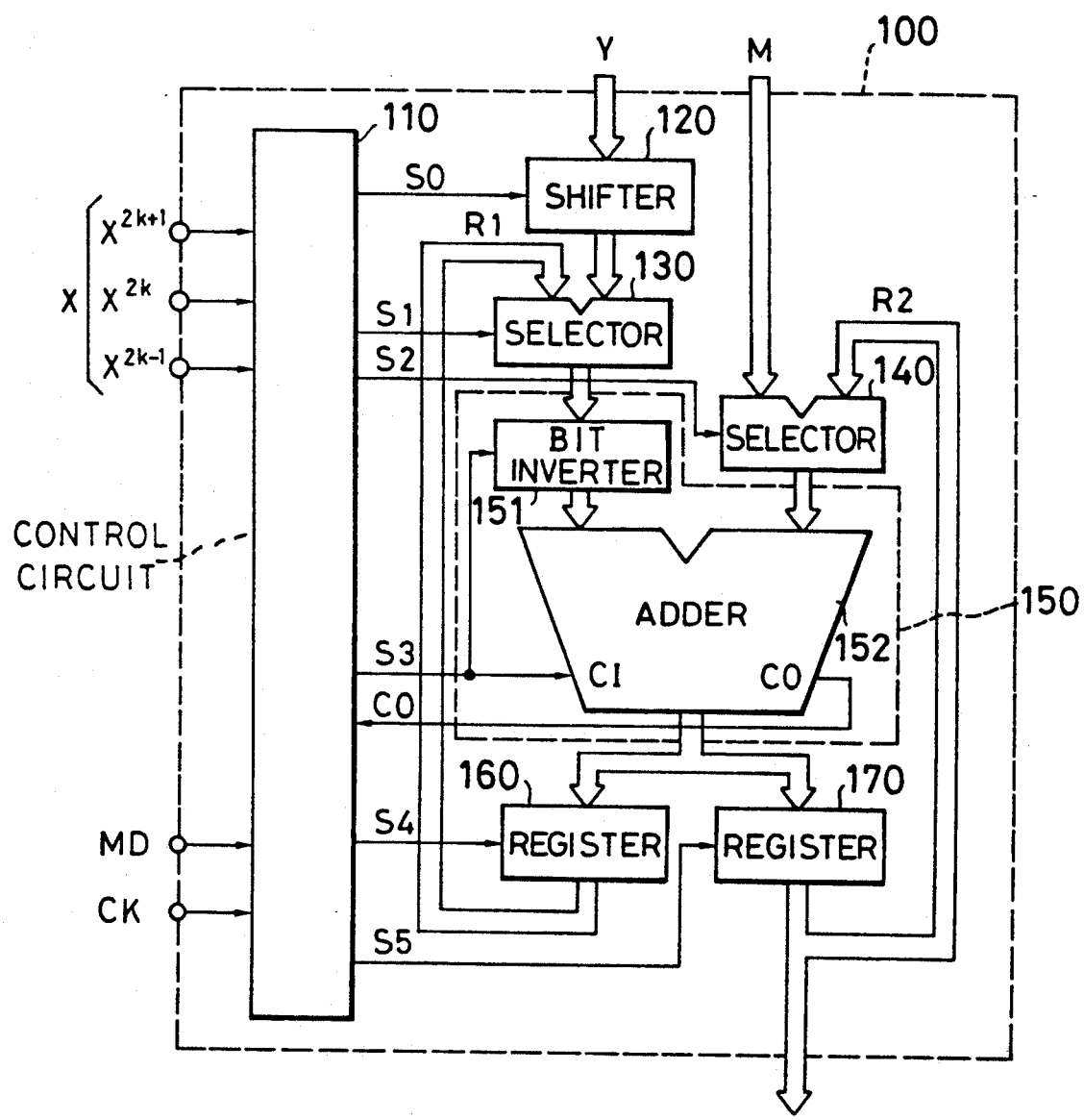
FIG. 1 is a block diagram of a novel processor element.

With reference to FIG. 1, a PE 100 has a control circuit 110 that receives a mode signal MD, a clock signal CK, three bits of input data $X^{2k+1}$, $X^{2k}$, $X^{2k-1}$, and a carry output signal CO, and generates therefrom six control signals S0, S1, S2, S3, S4, and S5. The mode signal and clock signal are supplied from external sources. The carry output CO is generated from within the PE 100 as described later. The three bits $X^{2k+1}$, $X^{2k}$, and $X^{2k-1}$ are part of third input data X supplied from an input bus not shown in FIG. 1. The superscripts $2k+1$, $2k$, and $2k-1$ denote bit positions in X, rather than exponents.

The control circuit 110 comprises, for example, logic circuits and a read-only memory (ROM). Structural details will be omitted, since those skilled in the art will readily understand how the control circuit 110 can be constructed from the description of the operation of the PE given later. Some of the signal lines may comprise more than one physical line: for example, the control signal S0 has at least three states, so its signal line may comprise two physical lines or more; the mode signal line may also comprise several lines, enabling the PE to operate in various modes for different purposes.

The PE also comprises a shifter 120, a first data selector 130, and a second data selector 140. The shifter 120 receives first input data Y and the control signal S0 and produces as output either the value zero or the first input data Y shifted by a certain number of bits, controlled by the control signal S0. In particular, the shifter 120 can perform a zero-bit shift, thereby reproducing the input data Y, and a one-bit left shift, thereby multiplying the input data Y by two.

The first and second data selectors 130 and 140 are two-to-one multiplexers. The first data selector 130 receives the output of the shifter 120, first result data R1, and the control signal S1, selects the first result data R1 or the output of the shifter 120 according to the control signal S1, and produces the selected data as output. The second data selector 140 receives second input data M, second result data R2, and the control signal S2, selects either the second input data M or second result data R2 according to the control signal S2, and produces the selected data as output.

The outputs of the first and second data selectors 130 and 140 are fed to an arithmetic means 150 comprising a bit inverter 151 and an adder 152. The bit inverter 151 and the adder 152 both receive the control signal S3. The control signal S3 has two values, which can conveniently be considered to be zero and one.

When S3 is zero, the arithmetic means 150 adds the outputs of the first data selector 130 and the second data selector 140 as follows: the bit inverter 151 passes the output of the first data selector 130 without alteration to the adder 152; the adder 152 adds the output of the bit inverter 151 to the output of the second data selector 140 and the value (zero) of the control signal S3.

When the control signal S3 is one, the arithmetic means 150 subtracts the output of the first data selector 130 from the output of the second data selector 140 as follows: the bit inverter 151 inverts all bits in the output of the first data selector 130 and passes the inverted result to the adder 152; the adder 152 adds the output of the bit inverter 151 to the output of the second data selector 140 and the value (one) of the control signal S3.

The control signal S3 thus functions as a carry input CI to the adder 152. The adder 152 also generates the carry output CO furnished to the control circuit 110. The carry output CO is the sign bit of the result produced by the adder 152, taking the value one when the result is negative and the value zero when the result is positive or zero.

The output of the adder 152 is fed to a first register 160 and a second register 170 and stored therein under control of the signals S4 and S5, respectively. The value stored in the first register 160 is provided as the first result data R1 to the first data selector 130. The value stored in the second register 170 is supplied as the second result data R2 to the second data selector 140, and is also supplied to the outside as the output of the PE 100. The second register 170 thus functions as an output register.

Next the operation of the PE 100 in various modes will be described.

In a first mode, the PE 100 receives a series of first and second input data $Y_i$ and $M_i$ and calculates the cumulative absolute difference D between them, which can be expressed mathematically as:

$$D = \sum_i |M_i - Y_i| \qquad (1)$$

This operation is used, for example, in block matching in image processing, to find the block that most nearly matches a given block.

In this first mode the control signal S0 always causes the shifter 120 to reproduce the first input data $Y_i$ without alteration. The other control signals alternate between two stages.

In the first stage, the first data selector 130 selects the first input data $Y_i$ as received from the shifter 120, the second data selector 140 selects the second data $M_i$, and the control signal S3 is in the zero state. At the end of the first stage, the control signal S4 causes the first register 160 to store the sum produced by the adder 152.

In the second stage the first data selector 130 selects the first result data R1, the second data selector 140 selects the second result data R2, and the control signal S3 has the same value as the carry output C0 in the preceding first stage. At the end of the second stage, the control signal S5 causes the second register 170 to store the result produced by the adder 152.

Figure 2:
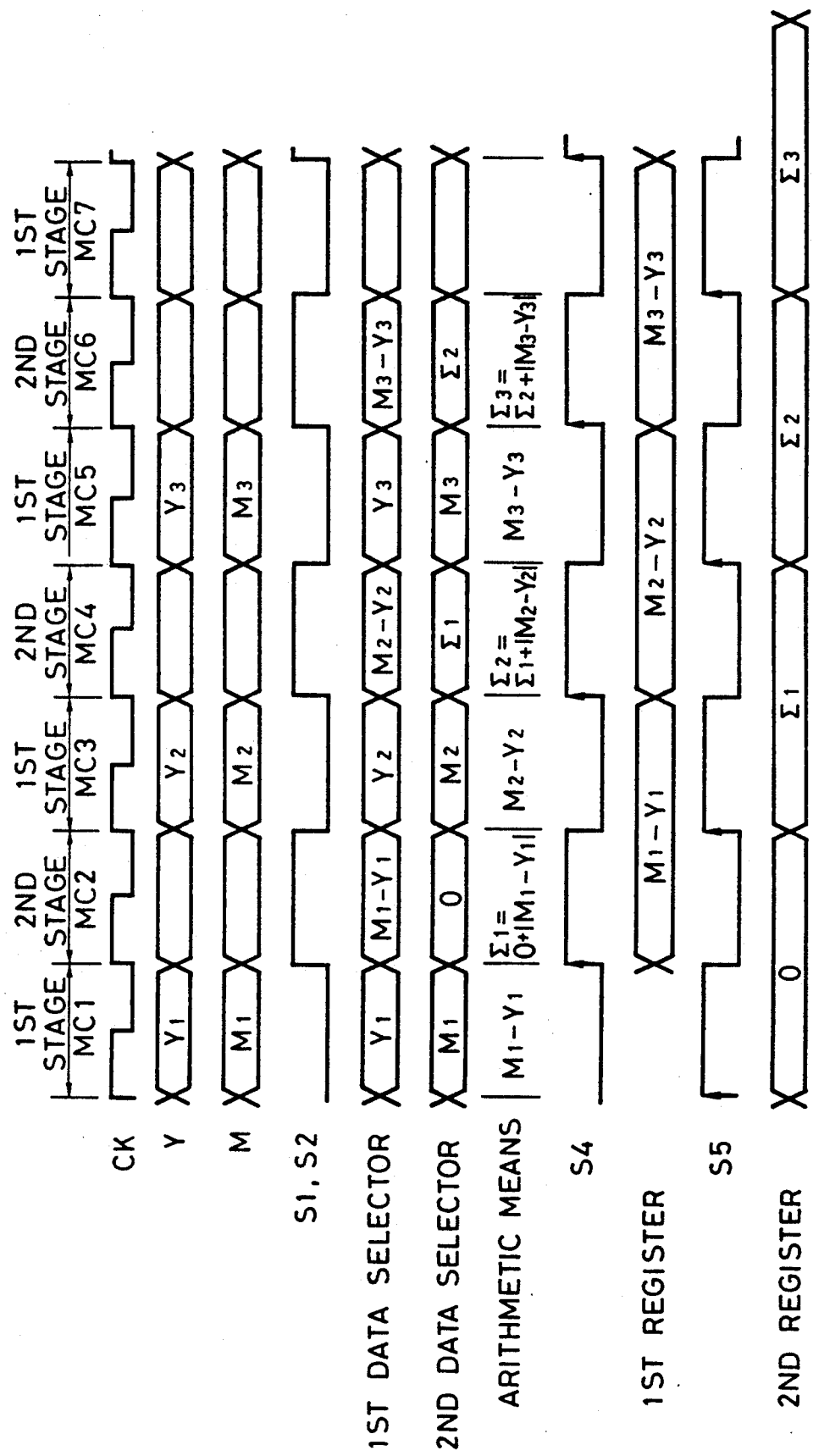
FIG. 2 is a timing chart showing how the novel processor element calculates a cumulative absolute difference.

The calculation of a cumulative absolute difference is illustrated in FIG. 2. The operation is divided into machine cycles MC1, MC2, . . ., each corresponding to one period of the clock signal CK. At the beginning of the operation the second register 170 is initialized to zero as shown at the bottom of FIG. 2.

In the first machine cycle MC1 the PE 100 executes first-stage operations. Control signals S1 and S2 are low, causing the first and second data selectors 130 and 140 to select input data $Y_1$ and $M_1$. Control signal S3 (not shown) is one, causing the bit inverter 151 and the adder 152 to execute the operation $M_1 - Y_1$. At the end of MC1 the first register 160 latches the value $M_1 - Y_1$ on the rising edge of the control signal S4.

In the second machine cycle MC2 the PE 100 executes second-stage operations. Control signals S1 and S2 are high, causing the first and second data selectors 130 and 140 to select the first and second register outputs $M_1 - Y_1$ and zero. If $M_1 - Y_1$ is negative then the carry output in the preceding first stage was one, so the control signal S3 is one and the bit inverter 151 and the adder 152 execute the operation $0-(M_1-Y_1)$. If $M_1-Y_1$ is positive or zero then the carry output in the preceding first stage was zero, so the control signal S3 is zero and the bit inverter 151 and the adder 152 execute the operation $0+(M_1-Y_1)$. In either case the bit inverter 151 and the adder 152 execute the operation $0+|M_1-Y_1|$, the result of which is denoted $\Sigma 1$ in the drawing. At the end of the second machine cycle MC2 this result $\Sigma 1$ is stored in the second register 170 on the rising edge of the control signal S5.

In the third machine cycle MC3 the PE 100 receives new input data $Y_2$ and $M_2$ and executes stage-one operations, storing the difference $M_2-Y_2$ in the first register 160. In the fourth machine cycle MC4 the PE 100 executes stage-two operations, adding the absolute value of $M_2-Y_2$ to the contents $\Sigma 1$ of the second register 170 and storing the result $\Sigma 2 = \Sigma 1 + |M_2-Y_2| = |M_1-Y_1| + |M_2-Y_2|$ in the second register 170.

Operation continues in this way, producing at the end of the sixth machine cycle MC6 the cumulative absolute difference of three pairs of first and second input data $\Sigma 3 = |M_1-Y_1| + |M_2-Y_2| + |M_3-Y_3|$. In this way an operation that employed a pipeline of three comparatively large processor elements in the prior art is carried out by a single novel processor element of much smaller size.

Figure 3:
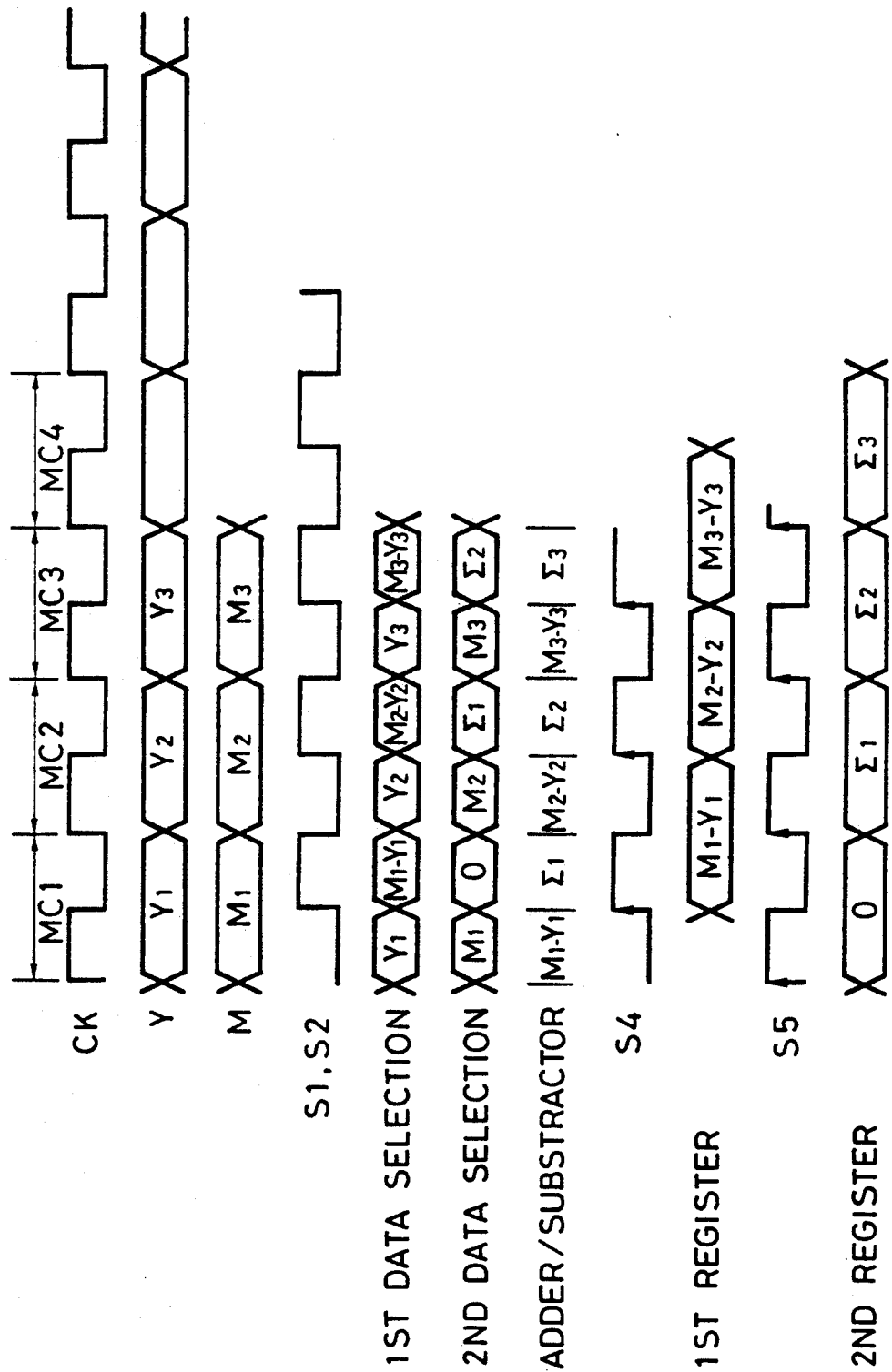
FIG. 3 is a timing chart of the cumulative absolute difference operation.

In FIG. 2 each stage of operation occupied one full clock period, so data could be input only in every other clock period. An alternative and preferably scheme, illustrated in FIG. 3, is to have the PE 100 switch between the first-stage and the second-stage operations at every half-period of the clock signal, the first stage being executed when the clock signal CK is low and the second stage when CK is high. Due to its simple structure the PE 100 can easily operate at this higher speed, and data can be input in every clock cycle, which is more convenient.

Next a second mode of operation, useful in computing an inner product by Booth's multiplication algorithm, will be described. In this mode the PE 100 receives first (multiplicand) data Y and three bits of third (multiplier) data X, manipulates Y according to the X bits, and accumulates the results. The control signals S0 and S3 are controlled according to X. The control signals S1 and S2 are held constant, causing the first data selector 130 always to select the output of the shifter 120 and the second data selector 140 always to select the second result data R2. The result data produced by the adder 152 are always stored in the second register 170, which initially holds the value zero.

The control signals S0 and S3 are arranged so that the output of the adder 152 is equal to:

$$R2 + (-2X^{2k+1} + X^{2k} + X^{2k-1}) \cdot Y$$

Table 1 summarizes the outputs of the shifter 120 as controlled by S0, the values of S3, and the resulting output of the adder 152.

TABLE 1

| $X^{2k+1}$ | $X^{2k}$ | $X^{2k-1}$ | Shifter output | S3 | Adder output |
|---|---|---|---|---|---|
| 0 | 0 | 0 | 0 | 0 | R2 |
| 0 | 0 | 1 | Y | 0 | R2 + Y |
| 0 | 1 | 0 | Y | 0 | R2 + Y |
| 0 | 1 | 1 | 2Y | 0 | R2 + 2Y |
| 1 | 0 | 0 | 2Y | 1 | R2 − 2Y |
| 1 | 0 | 1 | Y | 1 | R2 − Y |
| 1 | 1 | 0 | Y | 1 | R2 − Y |

TABLE 1-continued

| $X^{2k+1}$ | $X^{2k}$ | $X^{2k-1}$ | Shifter output | S3 | Adder output |
|---|---|---|---|---|---|
| 1 | 1 | 1 | 0 | 1 | R2 |

In addition to the two modes described above, the PE 100 can operate in various other modes too obvious to need detailed description. For example, it can produce the sum or difference of first and second input data by having the first and second data selectors always select Y and M and setting the control signal S3 to zero for M+Y, or to one for M−Y. Other possible arithmetic and logic operations include, but are not limited to, $\Sigma Y_i$ (cumulative sum of first input data), $\Sigma M_i$ (cumulative sum of second input data), $|Y|$ (absolute value of first input data), $|M|$ (absolute value of second input data), NOT Y (logical negation of first input data), and NOT M (logical negation of second input data).

If necessary, circuits for executing AND and OR logic operations can be added to the arithmetic means 150, or the arithmetic means 150 can be replaced by a simple integer arithmetic and logic unit of the type commonly employed in digital signal processors and microprocessors.

If the usage of the PE 100 is restricted, its structure can be further simplified. For example, if the only purpose is to calculate a cumulative absolute difference, the shifter 120 can be eliminated. If only a single absolute difference is required, the second register 170 can be eliminated and the contents of the first register 160 provided as external output.

Next a processing unit (PU) will be described that comprises a plurality of the novel processor elements. This processing unit can use its processor elements in a coordinated manner to perform multiplication. Just as easily, it can compute an inner product for vector and matrix operations. The processor elements can also operate in parallel to perform a variety of arithmetic and logic operations concurrently.

Figure 4:
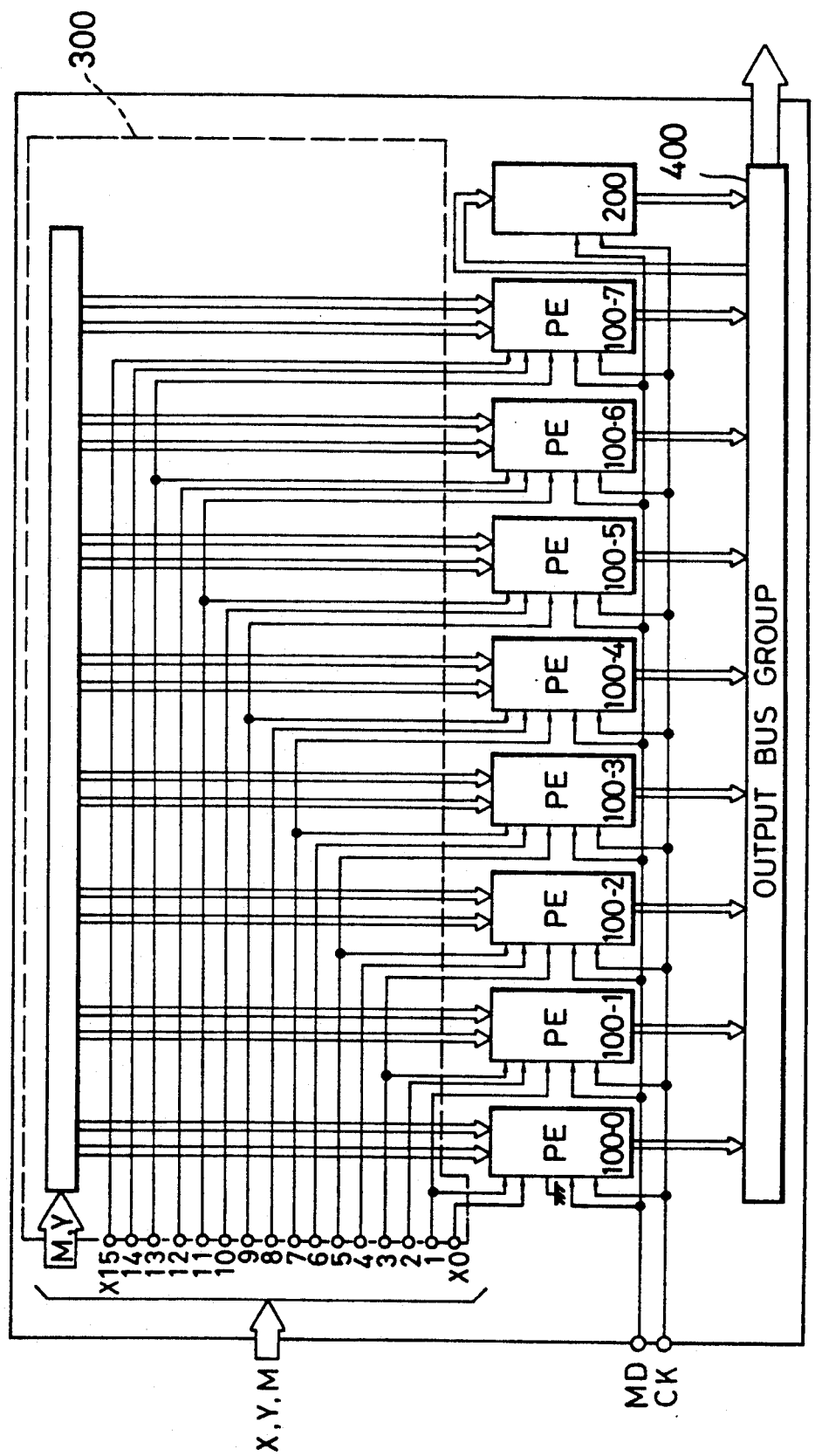
FIG. 4 is a block diagram of a novel processing unit.

With reference to FIG. 4 the PU comprises eight PEs 100-0 to 100-7 of the type shown in FIG. 1, a last-stage accumulator 200, an input bus group 300, and an output bus group 400. The input bus group 300 supplies first data Y, second data M, and third data X to the PEs 100-0 to 100-7. As can be seen in the drawing, the k-th PE 100-k receives the three bits $X^{2k+1}$, $X^{2k}$, and $X^{2k-1}$. The bit $X^{-1}$ is always zero which level is a ground level. The outputs produced by the PEs 100-0 to 100-7 are supplied to the output bus group 400, from which they can be supplied to the outside, or to the last-stage accumulator 200.

Figure 5:
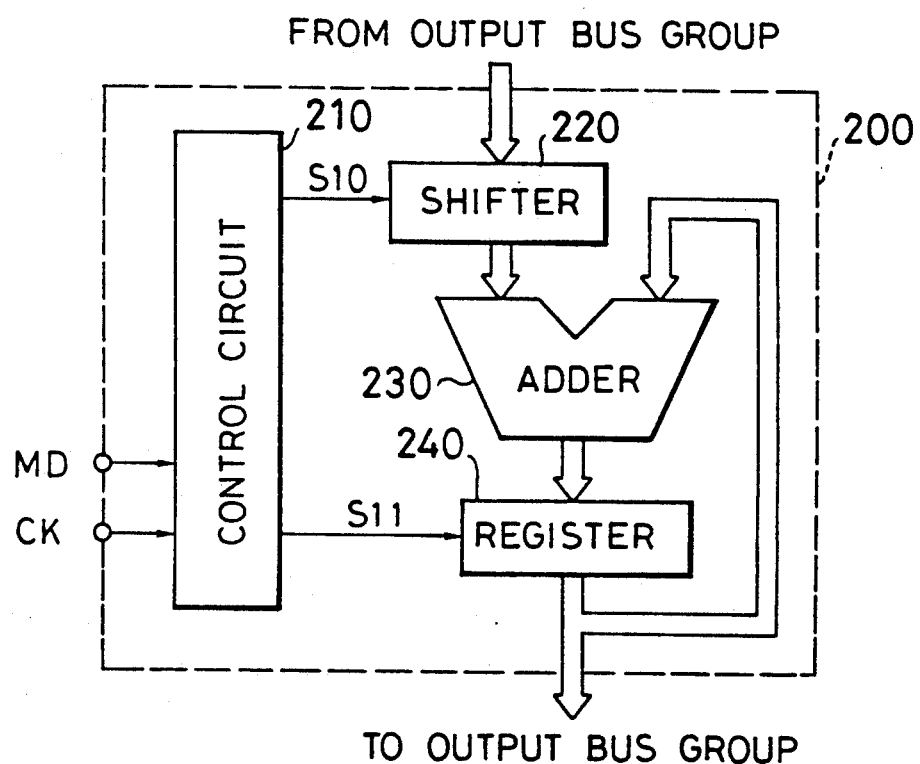
FIG. 5 is a block diagram of the last-stage accumulator in FIG. 4.

Referring to FIG. 5, the last-stage accumulator 200 comprises a control circuit 210, a shifter 220, an adder 230, and a register 240. The control circuit 210 receives a mode signal MD and a clock signal CK from the outside, and generates control signals S10 and S11. The shifter 220 receives data from the output bus group 400 and shifts the data zero, two, four, six, eight, ten, twelve, or fourteen bits to the left according to the control signal S10. The adder 230 adds the output of the shifter 220 to the output of the register 240 and produces the resulting sum. The register 240 latches this sum on the control signal S11 and supplies it to the adder 230 and the output bus group 400.

Operating independently, the PEs 100-0 to 100-7 in FIG. 4 can perform, for example, eight of the cumulative absolute difference operations illustrated in FIG. 2 or FIG. 3 concurrently. In a typical block matching application, each PE receives the same first data Y, but different second data M. Other arithmetic and logic operations involving addition, subtraction, absolute values, and logical negation can also be performed in parallel, eight at a time, by provision of appropriate mode signals to the PEs. Details will be omitted.

Next the use of the PU in FIG. 4 to calculate an inner product of the form $(X_1Y_1+X_2Y_2+\ldots+X_mY_m)$ will be described. For brevity, this inner product will be denoted $\Sigma XY$. The multiplications will be performed by the well-known Booth algorithm, which for a sixteen-bit multiplier X can be expressed by the formula:

$$XY = \sum_{k=0}^{7} (-2X^{2k+1} + X^{2k} + X^{2k-1}) \cdot Y \cdot 2^{2k} \quad (2)$$

or $$\begin{aligned} XY = \quad & (-2X^{15} + X^{14} + X^{13}) \cdot Y \cdot 2^{14} \\ & + (-2X^{13} + X^{12} + X^{11}) \cdot Y \cdot 2^{12} \\ & + (-2X^{11} + X^{10} + X^{9}) \cdot Y \cdot 2^{10} \\ & + (-2X^{9} + X^{8} + X^{7}) \cdot Y \cdot 2^{8} \\ & + (-2X^{7} + X^{6} + X^{5}) \cdot Y \cdot 2^{6} \\ & + (-2X^{5} + X^{4} + X^{3}) \cdot Y \cdot 2^{4} \\ & + (-2X^{3} + X^{2} + X^{1}) \cdot Y \cdot 2^{2} \\ & + (-2X^{1} + X^{0}) \cdot Y \cdot 2^{0} \end{aligned} \quad (3)$$

The inner product $\Sigma XY$ can be expressed as in equation (4).

$$\begin{aligned} \Sigma XY = \quad & \Sigma (-2X^{15} + X^{14} + X^{13}) \cdot Y \cdot 2^{14} \\ & + \Sigma (-2X^{13} + X^{12} + X^{11}) \cdot Y \cdot 2^{12} \\ & + \Sigma (-2X^{11} + X^{10} + X^{9}) \cdot Y \cdot 2^{10} \\ & + \Sigma (-2X^{9} + X^{8} + X^{7}) \cdot Y \cdot 2^{8} \\ & + \Sigma (-2X^{7} + X^{6} + X^{5}) \cdot Y \cdot 2^{6} \\ & + \Sigma (-2X^{5} + X^{4} + X^{3}) \cdot Y \cdot 2^{4} \\ & + \Sigma (-2X^{3} + X^{2} + X^{1}) \cdot Y \cdot 2^{2} \\ & + \Sigma (-2X^{1} + X^{0}) \cdot Y \cdot 2^{0} \end{aligned} \quad (4)$$

Using the notation, $$\Phi_k = \Sigma(-2X^{2k+1}+X^{2k}+X^{2k-1}) \quad (5)$$

the equation (4) can be written as equation (6):

$$\Sigma XY = \Phi_0 \cdot 2^0 + \Phi_1 \cdot 2^2 + \Phi_2 \cdot 2^4 + \Phi_3 \cdot 2^6 + \Phi_4 \cdot 2^8 + \Phi_5 \cdot 2^{10} + \Phi_6 \cdot 2^{12} + \Phi_7 \cdot 2^{14} \quad (6)$$

The term $\Phi_k$ is computed by the k-th PE 100-k in FIG. 4, $\Phi_0$ to $\Phi_7$ being computed concurrently. Then $\Phi_0$ to $\Phi_7$ are added with appropriate shifts by the last-stage accumulator 200. This will be illustrated with reference to FIGS. 6 to 8 for the four-term inner product:

$$X_1Y_1+X_2Y_2+X_3Y_3+X_4Y_4$$

Figure 6:
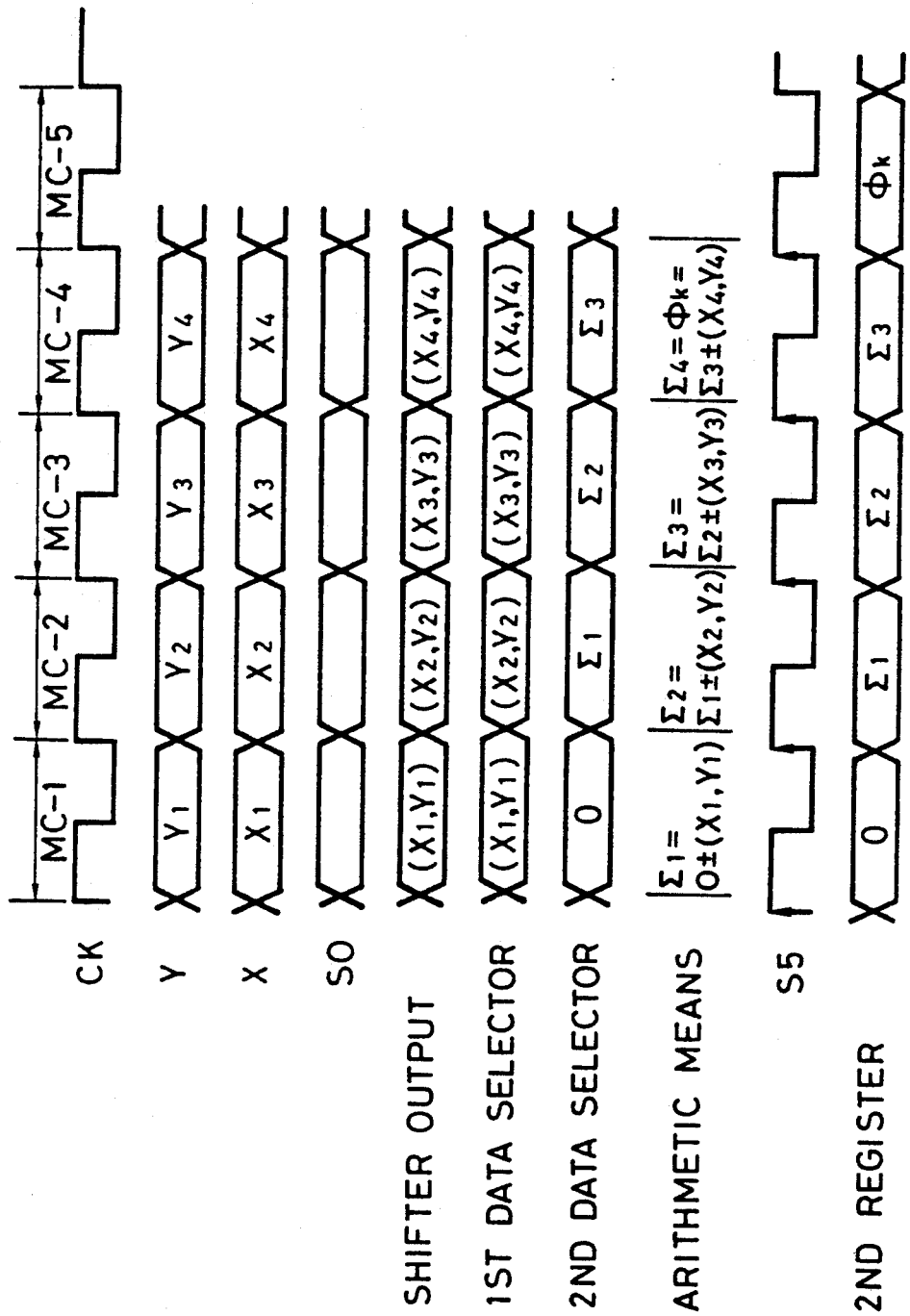
FIG. 6 is a timing chart of the first part of a multiplication operation performed by the novel processing unit.

Referring to FIG. 6, at the beginning of the inner-product operation the second registers 170 in all the PEs 100-0 to 100-7 are initialized to zero. In the first machine cycle MC1, the first and the third data $Y_1$ and $X_1$ are supplied to the PU and the mode signal MD sets the PEs 100-0 to 100-7 to their second mode of operation. Operating according to Table 1, the shifter 120 in each PE 100-k generates an output value equal to $Y_1$, $2Y_1$, or zero depending on the values of $X^{2k+1}$, $X^{2k}$, and $X^{2k-1}$, this output value being denoted $(X_1, Y_1)$ in the drawing, and the arithmetic means 150 adds or subtracts $(X_1, Y_1)$ to or from the zero value stored in the second register 170, producing the result denoted $\Sigma 1$ in the drawing. At the end of the first machine cycle MC-1 this result $\Sigma 1$ is stored in the second register 170 on the rising edge of the control signal S5. From FIG. 6 and Table 1 it is apparent that:

$$\Sigma 1 = (-2X_1^{2k+1}+X_1^{2k}+X_1^{2k-1}) \cdot Y_1$$

In the second machine cycle MC-2 the PU receives new first and third data $Y_2$ and $X_2$. Operating in the same way as in the first machine cycle, each PE 100-k calculates a value $(X_2, Y_2)$ and adds or subtracts $(X_2, Y_2)$ to or from the $\Sigma 1$ stored in the second register 170, thereby producing a value $\Sigma 2 = \Sigma 1 + (-2X_2^{2k+1}+X_2^{2k}+X_2^{2k-1}) \cdot Y_2$. At the end of the second machine cycle $\Sigma 2$ is placed in the second register 170.

Proceeding in similar fashion, each PE 100-k produces a value $\Sigma 3$ in the third machine cycle MC-3 and a value $\Sigma 4$ in the fourth machine cycle. $\Sigma 4$ is equal to $\Phi_4$ as defined above:

$$\begin{aligned} \Sigma 4 = \quad & (-2X_1^{2k+1} + X_1^{2k} + X_1^{2k-1}) \cdot Y_1 \\ & + (-2X_2^{2k+1} + X_2^{2k} + X_2^{2k-1}) \cdot Y_2 \\ & + (-2X_3^{2k+1} + X_3^{2k} + X_3^{2k-1}) \cdot Y_3 \\ & + (-2X_4^{2k+1} + X_4^{2k} + X_4^{2k-1}) \cdot Y_4 \\ = \quad & \Phi_4 \end{aligned} \quad (7)$$

The values $\Phi_k$ (k=0 to 7) are output from the PEs 100-0 to 100-7 starting in the fifth machine cycle MC-5. These values now become available on the output bus group 400 in FIG. 4.

Figure 7:
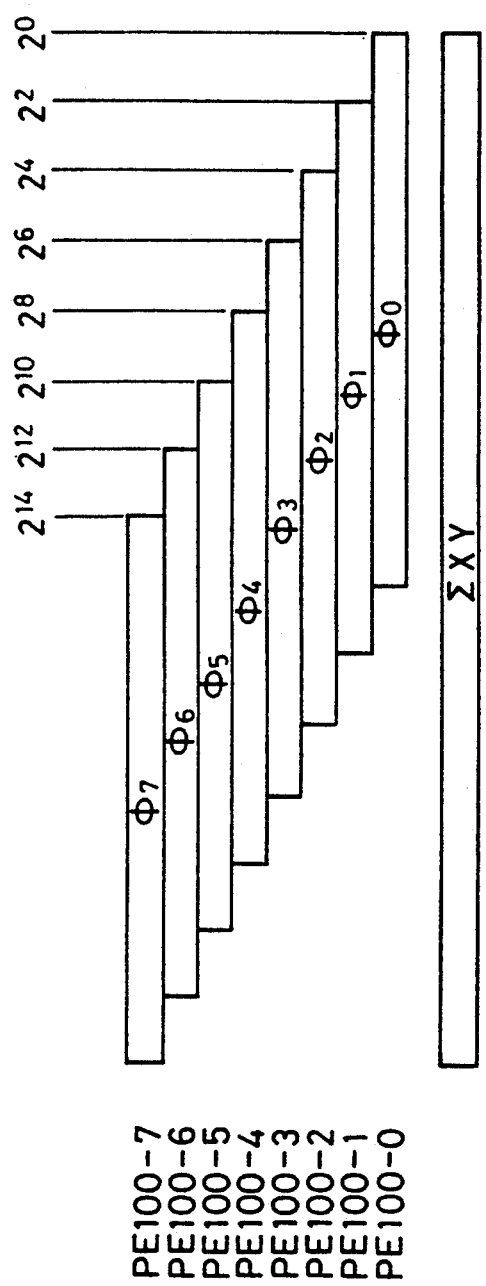
FIG. 7 is a shifting chart for the second part of the multiplication operation.

To carry out the computation shown in equation (6) it is necessary next to add up the $\Phi_k$ (k=0 to 7) with appropriate left shifts as illustrated in FIG. 7. This is accomplished in eight additional machine cycles by the last-stage accumulator 200.

Figure 8:
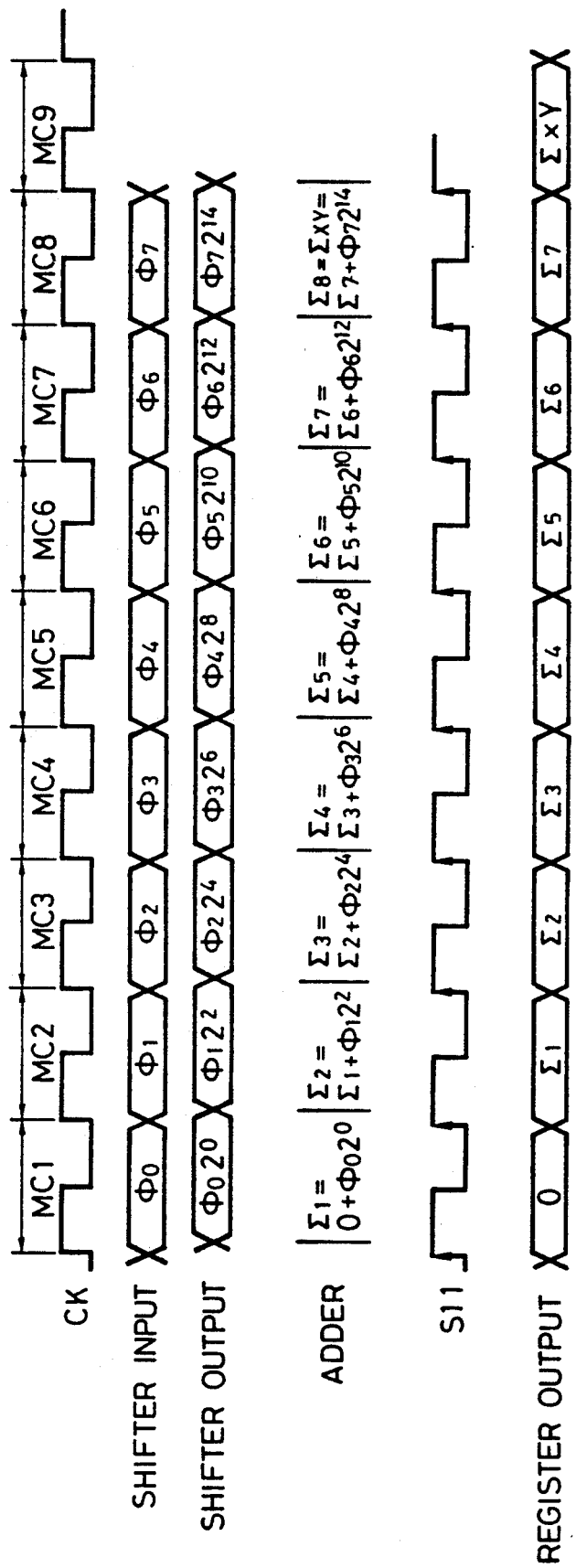
FIG. 8 is a timing chart of the second part of the multiplication operation.

Referring to FIG. 8, the register 240 in the last-stage accumulator 200 is initialized to zero. In a first machine cycle MC1 (which follows the fourth machine cycle MC-4 in FIG. 6), the shifter 220 in the last-stage accumulator 200 inputs $\Phi_0$ from the output bus group 400 and shifts it left by zero bits, thereby multiplying it by $2^0$. The adder 230 adds the result $\Phi_0 2^0$ to the zero value in the register 240, and the result $\Sigma 1$ is stored in the register 240 on the rising edge of the control signal S11.

In a second machine cycle MC2 the shifter 220 inputs $\Phi_1$ and shifts it two bits left, and the adder 230 adds the result to the value $\Sigma 1$ in the register 240 to produce $$\Sigma 2 = \Sigma 1 + \Phi_1 \cdot 2^2 = \Phi_0 \cdot 2^0 + \Phi_1 \cdot 2^2$$

Proceeding in this fashion, after an eighth machine cycle MC8 the last-stage accumulator 200 has produced $\Sigma 2XY$ as given in equation (6). In a ninth machine cycle MC9 the last-stage accumulator 200 places this $\Sigma 2XY$ on the output bus group 400 for external output, completing the inner product operation.

Compared with the prior art in which each PE had its own hardware multiplier, the novel PU requires a few extra machine cycles (MC1 to MC8 in FIG. 6) to compute an inner product, but the simple structure of the novel PEs enables them to operate faster than in the prior art, so speed is not necessarily lost. Moreover, the novel PU makes much more efficient use of its computing resources, because the same hardware that computes an inner product can perform up to eight operations not requiring multiplication, such as eight cumulative absolute difference operations, concurrently.

In place of a the last-stage accumulator 200, the PU can employ another PE having the structure shown in FIG. 1. In this case the shifter 120 must be capable of performing left shifts of two, four, . . . , fourteen bits as well as zero and one bits. This modification can also be made in the PEs 100-0 to 100-7 so that all nine PEs have the same design. A PU of this type can perform nine cumulative absolute difference operations concurrently. During the machine cycles in FIG. 8, the control signals S1 and S2 in the ninth PE should be held constant in states that cause the first data selector 130 to select the output of the shifter 120, and the second data selector 140 to select the output of the second register 170. The control signal S3 should be held constant in the zero state.

Instead of the inner product operation described above, it will be obvious that the novel PU can perform a single multiplication operation, by omitting machine cycles MC-2, MC-3, and MC-4 in FIG. 6 for example.

The bit length of the input data is not limited to sixteen bits; other bit lengths can be accommodated by changing the number of PEs. If the number of PEs is N, the novel PU can multiply 2N-bit numbers, or can simultaneously compute N cumulative absolute differences.

When the third input data X is a constant coefficient, part of the control circuit 110 of the PE in FIG. 1 can be replaced with a read-only memory circuit in which the expansion of X according to Booth's algorithm is stored in advance, thereby simplifying the operation and consequently increasing the speed of the operation.

Figure 9:
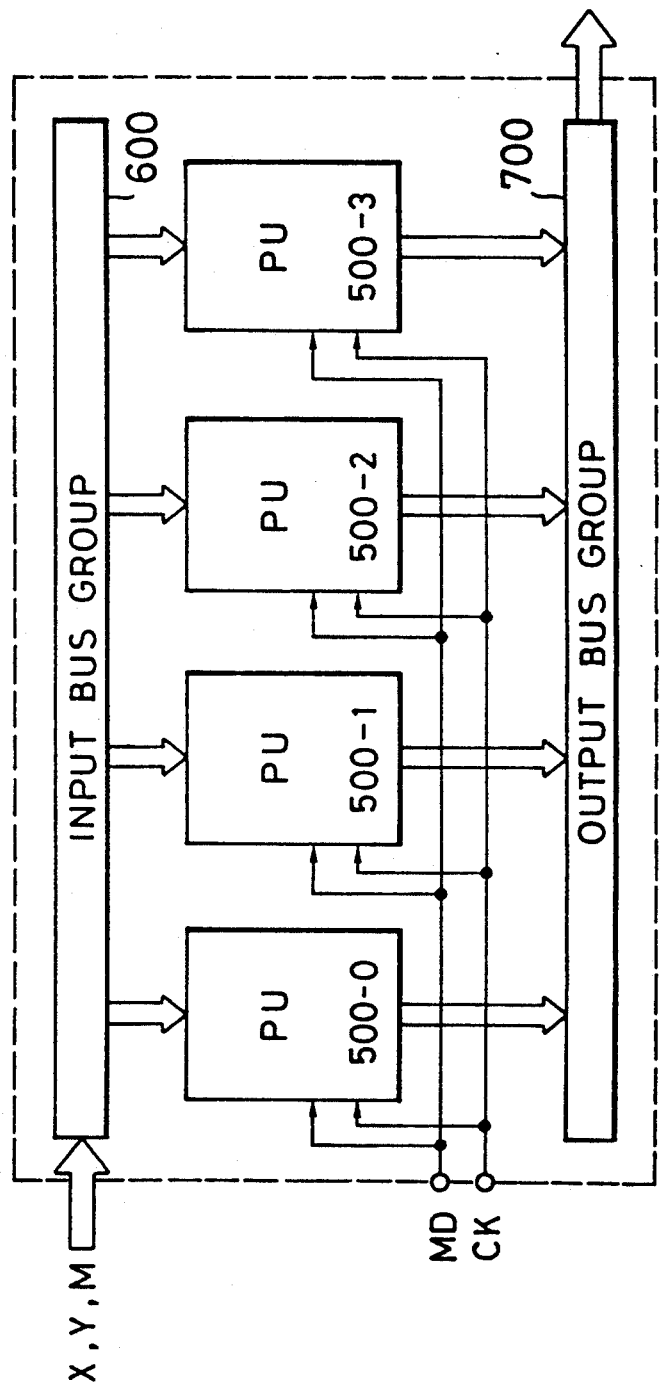
FIG. 9 is a block diagram of a novel processor.

FIG. 9 illustrates a novel processor comprising four PUs 500-0, 500-1, 500-2, and 500-3 of the type shown in FIG. 4, connected in parallel between an input bus group 600 and an output bus group 700 which are coupled to the input and output bus groups in FIG. 4. Receiving input data Y and X and mode and clock signals MD and CK, the four PUs 500-0 to 500-3 can concurrently compute four inner products, or their $4 \times 8 = 32$ constituent PEs can concurrently compute thirty-two cumulative absolute differences.

The novel processor in FIG. 9 is particularly suited for multiplying $4 \times 4$ matrices. As illustrated in FIG. 10, the multiplication is performed in four steps. In the first step, the four PUs concurrently compute the following inner products:

PU 500-0: $Z_{00} = X_{00}Y_{00} + X_{01}Y_{10} + X_{02}Y_{20} + X_{03} + Y_{30}$

PU 500-1: $Z_{01} = X_{00}Y_{01} + X_{01}Y_{11} + X_{02}Y_{21} + X_{03}Y_{31}$

PU 500-2: $Z_{02} = X_{00}Y_{02} + X_{01}Y_{12} + X_{02}Y_{22} + X_{03}Y_{32}$

PU 500-3: $Z_{03} = X_{00}Y_{03} + X_{01}Y_{13} + X_{02}Y_{23} + X_{03}Y_{33}$

In the second step, the four PUs concurrently compute:

PU 500-0: $Z_{10} = X_{10}Y_{00} + X_{11}Y_{10} + X_{12}Y_{20} + X_{13}Y_{30}$

PU 500-1: $Z_{11} = X_{10}Y_{01} + X_{11}Y_{11} + X_{12}Y_{21} + X_{13}Y_{31}$

PU 500-2: $Z_{12} = X_{10}Y_{02} + X_{11}Y_{12} + X_{12}Y_{22} + X_{13}Y_{32}$

PU 500-3: $Z_{13} = X_{10}Y_{03} + X_{11}Y_{13} + X_{12}Y_{23} + X_{13}Y_{33}$

Similarly, $Z_{20}$, $Z_{21}$, $Z_{22}$, and $Z_{23}$ are computed in the third step, and $Z_{30}$, $Z_{31}$, $Z_{32}$, and $Z_{33}$ in the fourth step, completing the matrix multiplication.

Since each processing unit must receive the same Y data four times, once in each step, the novel processor may include a cache memory for temporarily storing data, and bus control means for routing the data to the appropriate processing units. Such facilities are well known in the prior art; descriptions will be omitted.

The novel processor can perform $4 \times 4$ matrix operations other than multiplication. For example, it can multiply a matrix by a vector in a single step. Using sixteen of its thirty-two PEs in parallel, the novel processor can also add and subtract $4 \times 4$ matrices efficiently, the PEs operating in a simple add or subtract mode, each PE adding or subtracting a corresponding pair of elements in two matrices.

The invention is not limited to $4 \times 4$ matrices; $M \times M$ matrices of arbitrary size M can be accommodated by connecting M identical PUs in parallel. If each PU comprises N processor elements, the processor can also perform $M \times N$ simultaneous additions or subtractions, or compute $M \times N$ cumulative absolute differences simultaneously.

Figure 11:
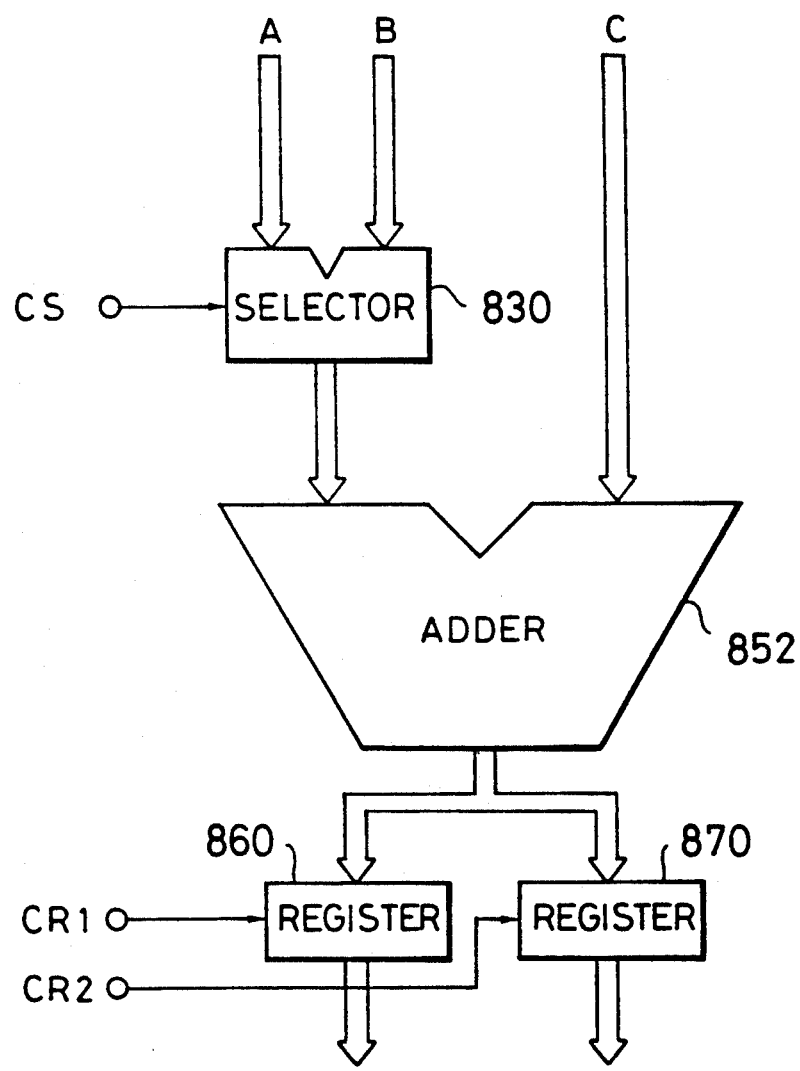
FIG. 11 is a block diagram of a processor element adapted for performing two series of addition operations rapidly.

FIG. 11 shows a simple processor element that receives input data A, B, and C and uses this timing scheme to perform two operations: $A + C$ and $B + C$.

This processor element comprises a data selector 830 that selects the first or second input data A or B, an adder that adds the selected input data to the third input data C, and first and second registers 860 and 870 that store the results. The data selector 830 is controlled by a selector control signal CS. The first and second registers 860 and 870 are controlled by first and second register control signals CR1 and CR2, respectively.

Figure 12:
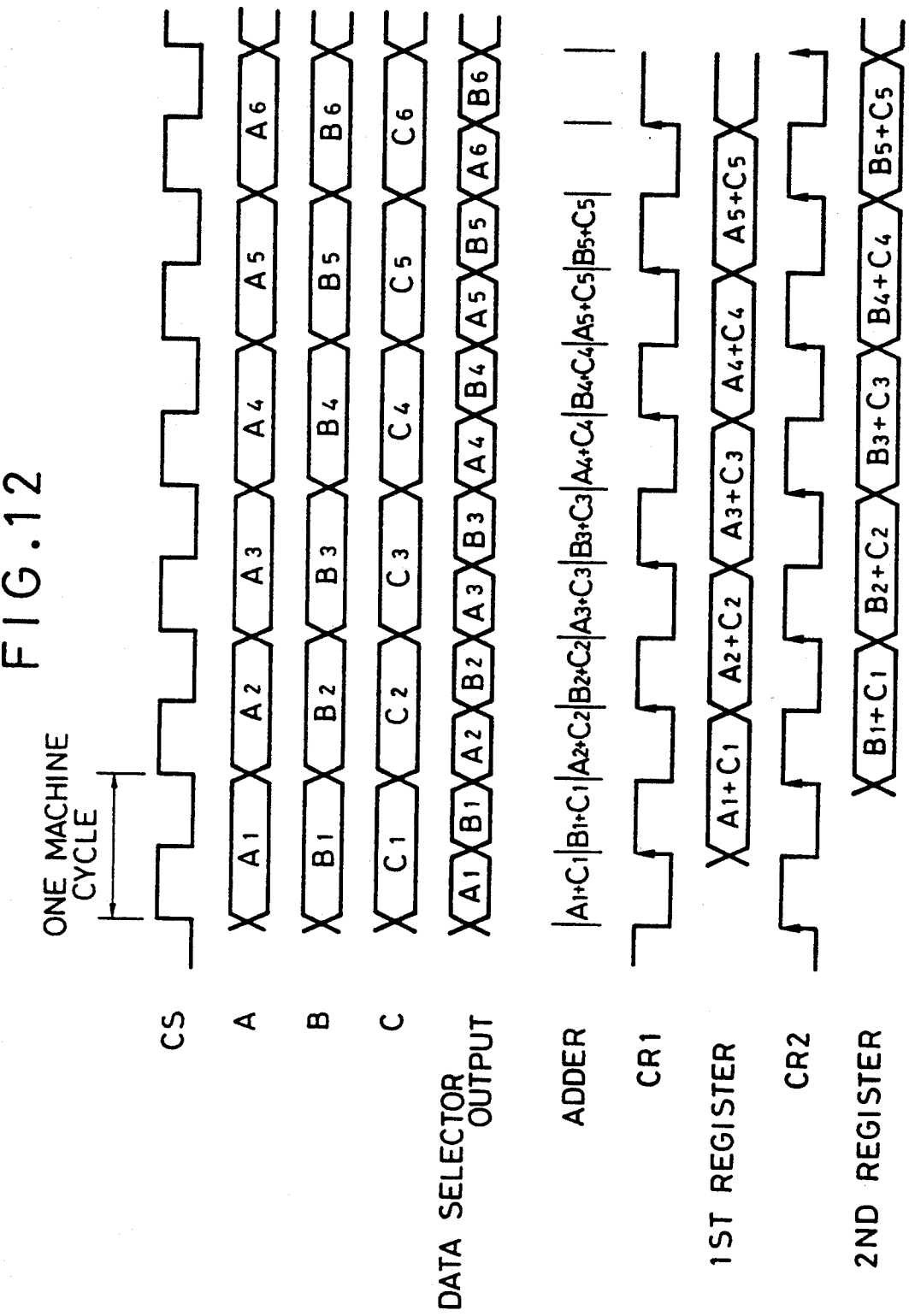
FIG. 12 is a timing chart of the two addition operations.

With reference to FIG. 12, the control signals CS, CR1, and CR2 have the same frequency as the clock (not shown), so that one machine cycle consists of one period of these control signals. The control signals CS and CR2 are identical. The control signal CR1 is opposite to the control signal CR2 in phase. Three data values $A_i$, $B_i$, and $C_i$ are input in each machine cycle.

In the first half of each machine cycle, the data selector 830 selects the data value $A_i$ and the adder 852 computes $A_i + C_i$. This result is stored in the first register 860 at the end of the first half of the machine cycle, on the rising edge of the first register control signal CR1.

In the second half of the machine cycle, the data selector 830 selects the data value $B_i$ and the adder 852 computes $B_i + C_i$. This result is stored in the second register 870 at the end of the second half of the machine cycle, on the rising edge of the second register control signal CR2. Operating in this way, the processor element in FIG. 11 produces two results per machine cycle.

It will be apparent that the processing element in FIG. 11 can be combined with that in FIG. 1 by the simple addition of another external input to the first data selector 130 in FIG. 1 and an external output from the first register 160 in FIG. 1. In general, the concept shown in FIGS. 11 and 12 can be applied to any processor element of sufficiently simple structure that its circuits are capable of operating at twice the data input rate.

What is claimed is:

1. A processing unit for executing parallel cumulative absolute difference operations in a first mode, and an inner product operation in a second mode, comprising:

an input bus group for receiving first input data, second input data, and third input data;

a plurality of processor elements coupled to said input bus group, each processor element being coupled to compute a cumulative absolute difference between said first input data and said second input data in said first mode, and to compute and accumulate one term of Booth's algorithm for multiplying said first input data by said third input data in said second mode;

an output bus group coupled to said processor elements, for receiving the terms of Booth's algorithm; and an accumulator circuit coupled to said output bus group, for shifting and adding terms of Booth's algorithm output by said processor elements.

2. The processing unit of claim 1, wherein each processor element operates in a first stage and a second stage in said first mode, and only in said second stage in said second mode, and comprises:

a shifting circuit for receiving said first input data and shifting said first input data in response to said third input data;

a first input circuit for receiving output of said shifting circuit and first result data, outputting the output of said shifting circuit in said first stage, and outputting said first result data in said second stage;

a second input circuit for receiving second input data and second result data, outputting said second input data in said first stage, and outputting said second result data in said second stage;

an arithmetic circuit coupled to said first input circuit and said second input circuit, for producing said first result data in said first stage and said second result data in said second stage by controllably adding or subtracting the output data of said first input circuit to or from the output data of said second input circuit;

a first register, coupled to said arithmetic circuit, for storing said first result data and supplying said first result data to said first input circuit; and a second register circuit, coupled to said arithmetic circuit, for storing said second result data and supplying said second result data to said second input circuit.

3. The processing unit of claim 2, wherein, in said first mode, said shifting circuit produces the output data equal to said first input data.

4. The processing unit of claim 1, wherein, in said second mode, said shifting circuit produces output equal to said first input data, to said first input data shifted left by one bit, or to zero, responsive to bits of said third input data.

5. The processing unit of claim 2, wherein, in said first mode, said arithmetic circuit is controlled:
to subtract in said first stage;
to subtract in said second stage if said first result data is negative; and
to add in said second stage if said first result data is positive or zero.

6. The processing unit of claim 2, wherein, in said second mode, said arithmetic circuit is controlled to add or subtract responsive to bits of said third input data.

7. The processing unit of claim 2, wherein said arithmetic circuit comprises:
a bit inverting circuit coupled to said first input circuit, for inverting all bits of the output data of said first input circuit in said first stage, and in said second stage if said first result data is negative, but leaving output of said first input circuit unaltered in said second stage if said first result data is positive or zero; and an adding circuit, coupled to said bit inverting circuit and said second input circuit, for adding the output data of said bit inverting circuit to the output data of said second input circuit and a carry bit, said carry bit being equal to one when said bit inverting circuit inverts the bits of the output data of said first input circuit, and equal to zero when said bit inverting circuit does not invert the bits of the output data of said first input circuit, and for outputting said first and second result data.

8. The processing unit of claim 1, wherein said accumulator comprises:
a shifting circuit for successively receiving terms of Booth's algorithm and shifting said terms by different numbers of bits;
adding circuit, coupled to said shifting circuit, for adding output thereof to register output; and
a register, coupled to said adding circuit, for storing output of said adding circuit and providing same to said adding circuit as said register output.

9. A processor for multiplying $M \times M$ matrices, M being an integer greater than one, comprising:
an input bus group for input of data;
M processing units coupled to said input bus group for executing a parallel cumulative absolute difference operation in a first mode, and an inner product operation in a second mode; and
an output bus group, coupled to said M processing units, for output of data therefrom;
wherein said processing units include processor elements;
wherein said input bus group is for receiving first input data, second input data, and third input data;
wherein a plurality of said processor elements are coupled to said input bus group, each processor element being coupled to compute a cumulative absolute difference between said first input data and said second input data in said first mode, and to compute and accumulate one term of Booth's algorithm for multiplying said first input data by said third input data in said second mode;
wherein said output bus group is coupled to said processor elements, for receiving the terms of Booth's algorithm;
wherein said processor further comprises accumulator means coupled to said output bus group, for shifting and adding terms of Booth's algorithm output by said processor elements;
wherein each processor element operates in a first stage and a second stage in said first mode, and only in said second stage in said second mode; and
wherein each processor element comprises:
shifting means for receiving said first input data and shifting said first input data by one bit;
first input means for receiving output of said shifting means and first result data, outputting the output of said shifting means in said first stage, and outputting said first result data in said second stage;
second input means for receiving second input data and second result data, outputting said second input data in said first stage, and outputting said second result data in said second stage;
arithmetic means coupled to said first input means and said second input means, for producing said first result data in said first stage and said second result data in said second stage by controllably adding or subtracting the output data of said first input means to or from the output data of said second input means;

first register means, coupled to said arithmetic means, for storing said first result data and supplying said first result data to said first input means; and second register means, coupled to said arithmetic means, for storing said second result data and supplying said second result data to said second input means.

10. A processor element for calculating an absolute difference by operating in a first stage and a second stage comprising:

a control circuit for outputting a first, a second and a third control signal each of which has a first logic level in the first stage and a second logic level in the second stage, a fourth control signal having the second logic level in the first stage and the first logic level in the second stage and a fifth control signal having a third logic level and a fourth logic level when the control circuit receives a carry signal;

a first input circuit coupled to said control circuit for receiving a first input data and a first result data and for outputting the first input data in response to the first logic level of the first control signal and the first result data in response to the second logic level of the first control signal;

a second input circuit coupled to said control circuit for receiving a second input data and a second result data and for outputting the second input data in response to the first logic level of the second control signal and the second result data in response to the second logic level of the second control signal;

a bit inverting circuit coupled to said control circuit and said first input circuit for inverting all bits of the data output from said first input circuit in response to the third logic level of the fifth control signal, but leaving output of the data output from said first input circuit in response to the fourth logic level of the fifth control signal;

an adding circuit coupled to said control circuit, said bit inverting circuit and said second input circuit for adding the data output from said bit inverting circuit to the data output from said second input circuit and the third logic level of the fifth control signal and for producing the first and second result data and the carry signal when the first result data is negative;

a first register coupled to said adding circuit and said first input circuit and for storing the first result data in response to the first logic level of the third control signal and for outputting the first result data to the first input circuit in response to the second logic level of the third control signal;

a second register coupled to said adding circuit and said second input circuit and for storing the second result data in response to the first logic level of the fourth control signal and for outputting the second result data in response to the second logic level of the fourth control signal; and an output data bus coupled to the second register for receiving the second result data.

11. The processor element of claim 10, wherein the fifth control signal has the third logic level when the first result data is negative and the fourth logic level when the first result data is zero or positive.

12. The processor element of claim 10, wherein said second register is initialized to zero, then the processor element receives the first input data and the second input data simultaneously at a certain rate, and alternates between said first stage and said second stage at twice said rate.

* * * * *